Aug. 6, 1940.                C. NORDHOUGEN                2,209,997
                           BINDER REEL ATTACHMENT
                             Filed Oct. 17, 1939
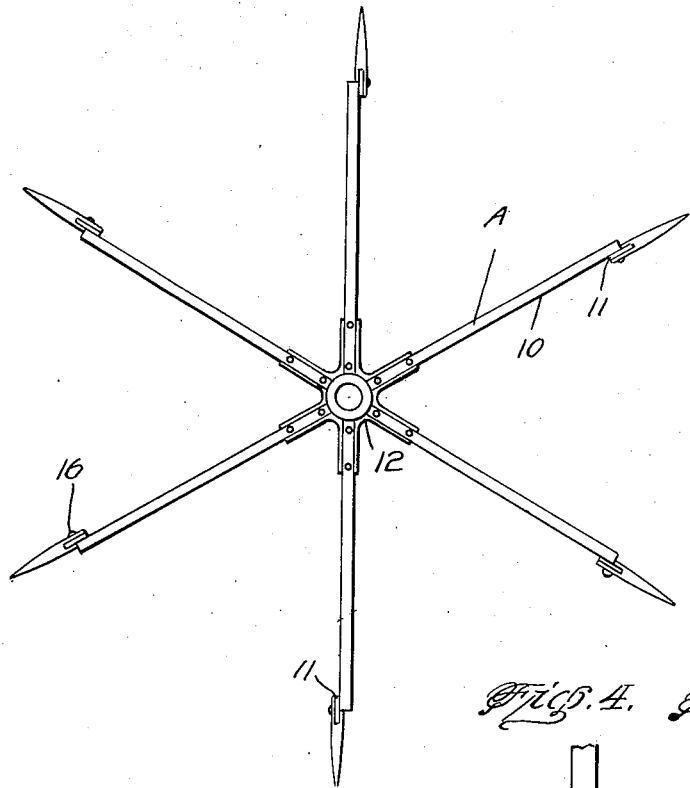
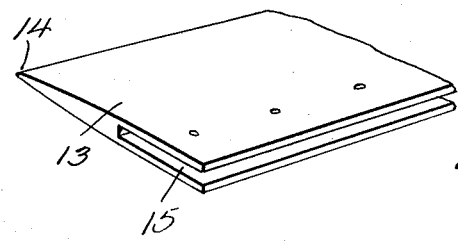
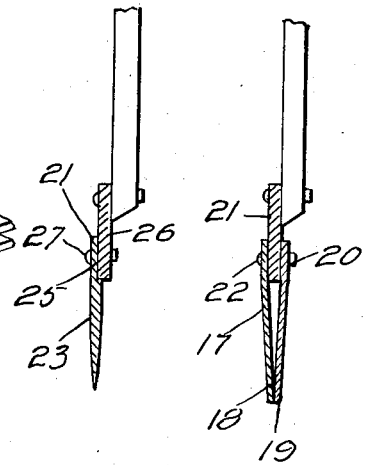
Carl Nordhougen, INVENTOR
BY Victor J. Evans & Co.
                                                    ATTORNEYS Patented Aug. 6, 1940

2,209,997

UNITED STATES PATENT OFFICE 2,209,997

BINDER REEL ATTACHMENT

Carl Nordhougen, Leeds, N. Dak.

Application October 17, 1939, Serial No. 299,872

1 Claim. (Cl. 56—220)

The invention relates to a grain saving attachment and more especially to a binder, harvester or combine reel attachment.

The primary object of the invention is the provision of an attachment of this character, wherein the reel of a grain binder, harvester or combine has yieldable impact members carried by cross slats or blades so that such reel will pick up grain that is standing irregularly resultant from clogging and lodging of the grain owing to the fact that the reel will cooperate with the guards and thus sweep the grain onto the platform with less grain being shelled and wasted which occurs when being struck by the reel slats, especially where a binder, harvester, combine or the like is driven by a fast moving tractor.

Another object of the invention is the provision of an attachment of this character, wherein the construction thereof is novel and avoids damage to wheat grains, wheat straw or the like when gathering by a binder and assures a saving of such grain during the working of said binder.

A further object of the invention is the provision of an attachment of this character which is simple in its construction, thoroughly reliable and efficient in operation, and inexpensive to manufacture and install.

With these and other objects in view, the invention consists in the features of construction, combination and arrangement of parts as will be hereinafter more fully described in detail, illustrated in the accompanying drawing, which discloses the preferred and modified forms of embodiment of the invention and pointed out in the claim hereunto appended.

In the accompanying drawing:

Figure 1 is a side elevation of a reel of a grain binder showing the attachment constructed in accordance with the invention applied.

Figure 2 is a fragmentary perspective view of one of the yieldable impact blades involved in the attachment.

Figure 3 is a fragmentary transverse sectional view through a modified form of blade.

Figure 4 is a view similar to Figure 3 showing a further modification.

Similar reference characters indicate corresponding parts throughout the several views in the drawing.

Referring to the drawing in detail, A designates generally a reel of a grain binder, harvester or combine (not shown) and as usual includes the radially disposed arms 10 carrying the cross slats 11 and these arms emerge from a hub 12, the reel being of conventional construction while adapted for fitting with the slats 11 of said reel is the attachment constituting the present invention and hereinafter described.

The attachment comprises a plurality of yieldable blades, each including a strip-like body 13 of rubber having reversely beveled opposite sides convergent toward a lead edge 14 while the heel edge of the said body 13 is channeled at 15 and of a size for snugly saddling a slat 11 for supporting the same. This body 13 is made fast to the slat 11 in any suitable manner, preferably by tackings 16. The body 13 is preferably made from rubber having the required yieldability and is of a length to be co-extensive with the slat 11 carrying the same between the arms 10 supporting said slat. The body 11 in the sweep thereof effects an impact upon grain handled within a binder and effects a light striking or slapping action upon the grain into the platform after the grain is cut off by a sickle without freeing the kernels from the shells.

In Figure 3 of the drawing there is shown a slight modification of the invention wherein the blade is formed from two plies of a yieldable material or sheet-like strips 17 which at their lead edges 18 are united together through cement or otherwise 19 and their heel edges 20 overlap opposite faces of the slat 21 of the reel, the strips or plies being preferably made from rubber and fiber and one ply may be more flexible or yieldable than the other and is fastened as at 22 to the slat.

In Figure 4 of the drawing there is shown a further modification of the invention wherein the blade is made from a single strip or ply 23 being inherently yieldable and in one face thereof following the heel edge 24 of the same is a recess 25 accommodating the edge portion of a slat 26 and this blade is fastened to the latter as at 27.

The reel A with the attachment carried thereby operates in the conventional manner in a grain binder, harvester or combine and the blades projecting from the slats 11 of said reel effect light impact upon the grain during the working of the binder without freeing the kernels from the shells and thereby assuring a saving in the grain during the handling thereof by the binder.

In the working of the invention the reel bends the grain over toward the platform canvas of the binder and as the sickle cuts the straw of the grain off the resilient characteristic of the rubber slightly slaps the grain down onto the platform canvas of said binder and thus prevents the wind from disturbing it before it is elevated and made into bundles and in this manner resulting in the making of better bundles.

What is claimed is:

An attachment for a binder reel having radially disposed arms carrying cross slats, comprising striplike attenuated blades of rubber having reversely inclined opposite sides converging outwardly to a lead edge for each blade, and means fixedly fastening the blades to the slats, the heel edges of the blades being arranged in overlapping relation to the slats and such blades coextensive with the length of said slats, the said blades being yieldable throughout the areas thereof beyond the overlap of the same and the said slats for effecting a light slapping action when the reel is operating.

CARL NORDHOUGEN.